No. 752,485. Patented February 16, 1904.

UNITED STATES PATENT OFFICE.

LEONARD SCHADE VAN WESTRUM, OF BERLIN, GERMANY.

METHOD OF SPRINKLING STREETS, &c.

SPECIFICATION forming part of Letters Patent No. 752,485, dated February 16, 1904.

Application filed August 1, 1903. Serial No. 167,942. (No specimens.)

*To all whom it may concern:*

Be it known that I, LEONARD SCHADE VAN WESTRUM, a subject of the Queen of the Netherlands, residing at Wilhelmstrasse 90, Berlin, Germany, have invented certain Improvements in Methods of Sprinkling Streets and the Like, of which the following is a specification.

My invention relates to an improved process for laying the dust and keeping in good order the surface of streets, surface of railways, yards, open and closed rooms, and the like. In my process oily substances soluble in water or other not volatile oily materials are in known manner employed for sprinkling streets and the like, whereby use is made of the fact that oily substances evaporate very slowly. However, I carry out my process in a special manner by using in combination with the oily substances other materials, so that the final result obtained is much improved.

My process is performed in the following manner: Before sprinkling the surface of the street and the like with the oily substance I soak the same with a highly-concentrated solution of a salt soluble in water, preferably a hygroscopic salt, such as calcium chlorid, magnesium chlorid, and the like. However, one may also use salt water or brine, mother-lyes obtained in the chemical industry and in the paper or cellulose industry or in the sugar-refining industry, as molasses, treacle, and the like. If desired, said bodies may also be used in combination with substances having disinfecting properties. After the surface of the street and the like has been soaked with such salt solutions which have the property of binding the dust, said street-surface and the like is sprinkled with a small layer of the oily substances or other not volatile oily materials. In this manner a drying up of the salt solutions or a washing out of the same from the street-surface and the like in snowy or rainy weather is prevented.

The salt solution contained below in the ground penetrates deeply enough in the earth, keeps the same in a wet condition, and lays or binds constantly the dust. In some respect the oily substance swims upon the salt solution, said oily substance covering and protecting said salt solution, so that the dust laying or binding property of the salt solution is increased, as the oily substance also possesses the property of laying dust.

Having now particularly described and ascertained the nature of my said invention and in what manner the same is to be performed, I declare that what I claim is—

1. A method of laying the dust and keeping in good condition the surface of streets, railway-surfaces such as tracks, yards, rooms and the like, consisting in soaking the street-surface and the like with a solution of a salt soluble in water, and sprinkling said street and the like with an oily substance soluble in water, substantially as set forth.

2. A method of laying the dust and keeping in good condition the surface of streets, railways, streets, yards, rooms and the like consisting in soaking the street-surface and the like with a solution of a salt soluble in water, and sprinkling said street-surface and the like with a not volatile oily substance, substantially as set forth.

In witness whereof I have hereunto signed my name, this 11th day of July, 1903, in the presence of two subscribing witnesses.

LEONARD SCHADE VAN WESTRUM.

Witnesses:
 WOLDEMAR HAUPT,
 HENRY HASPER.